Patented June 17, 1924.

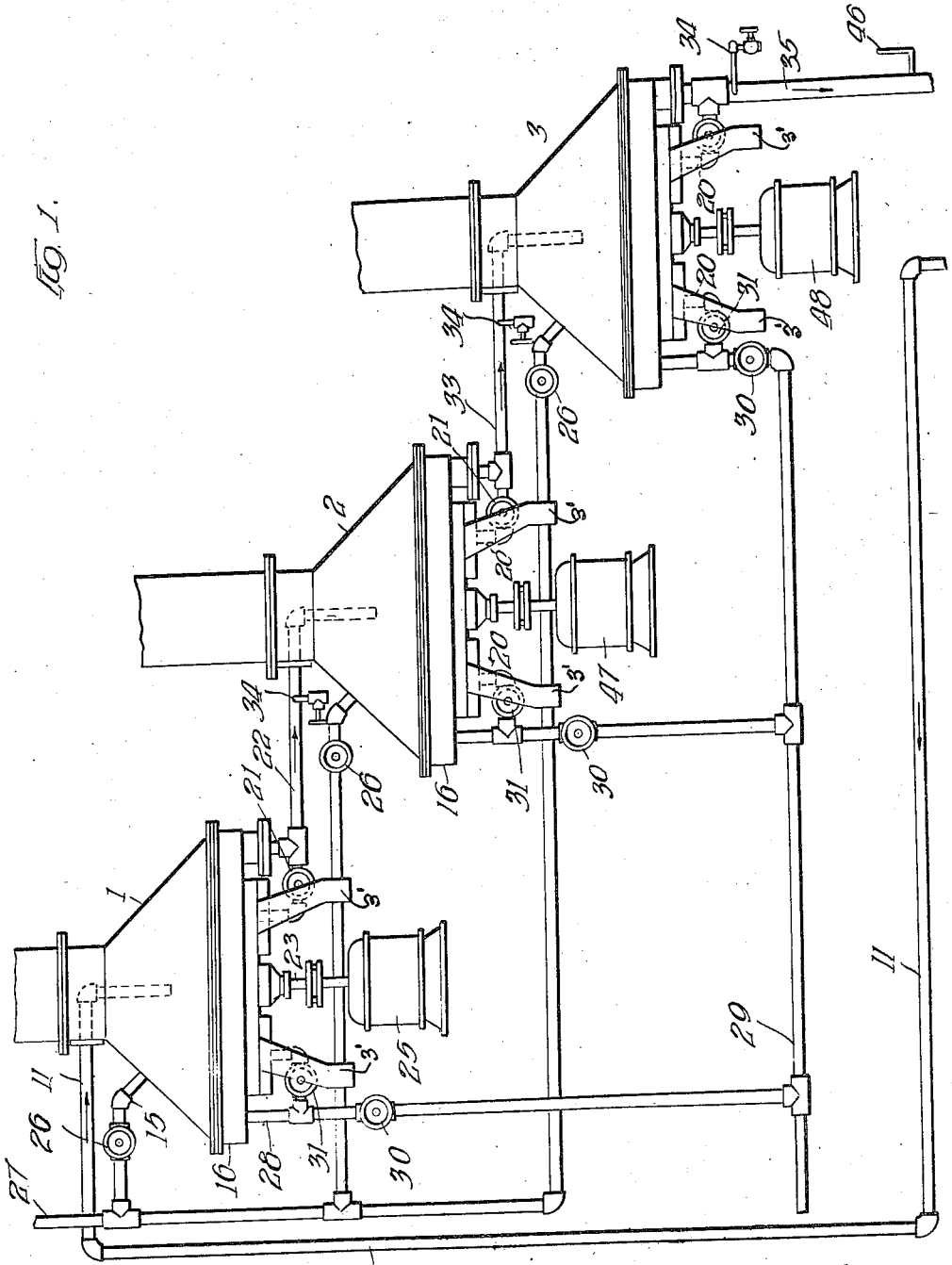

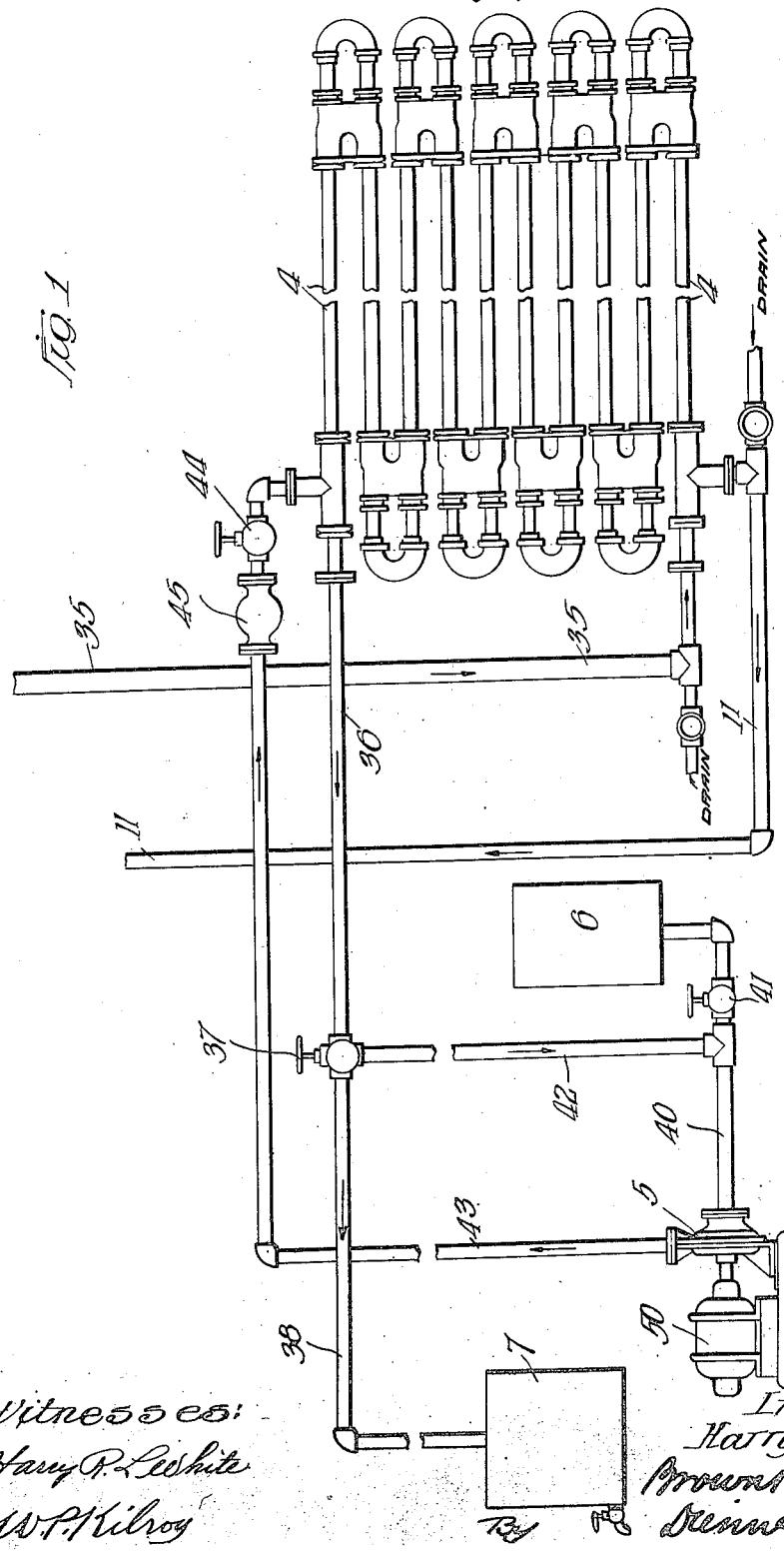

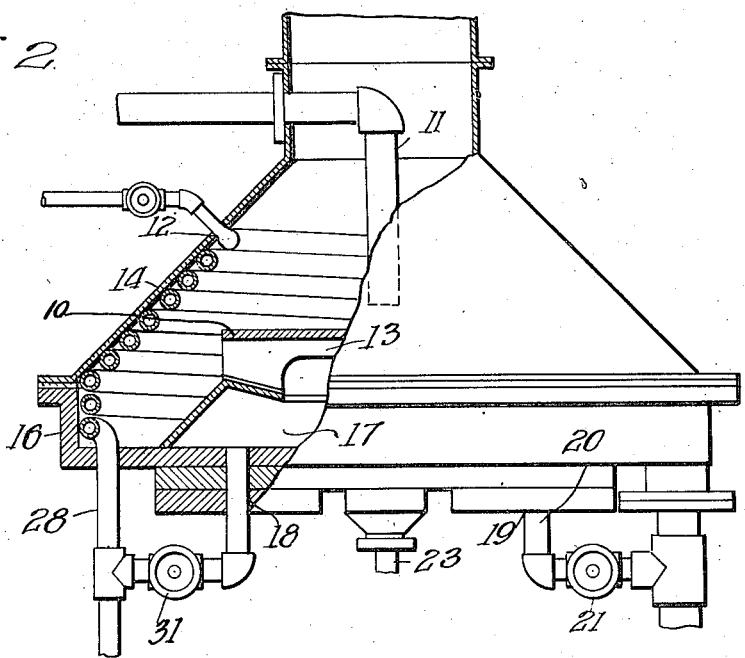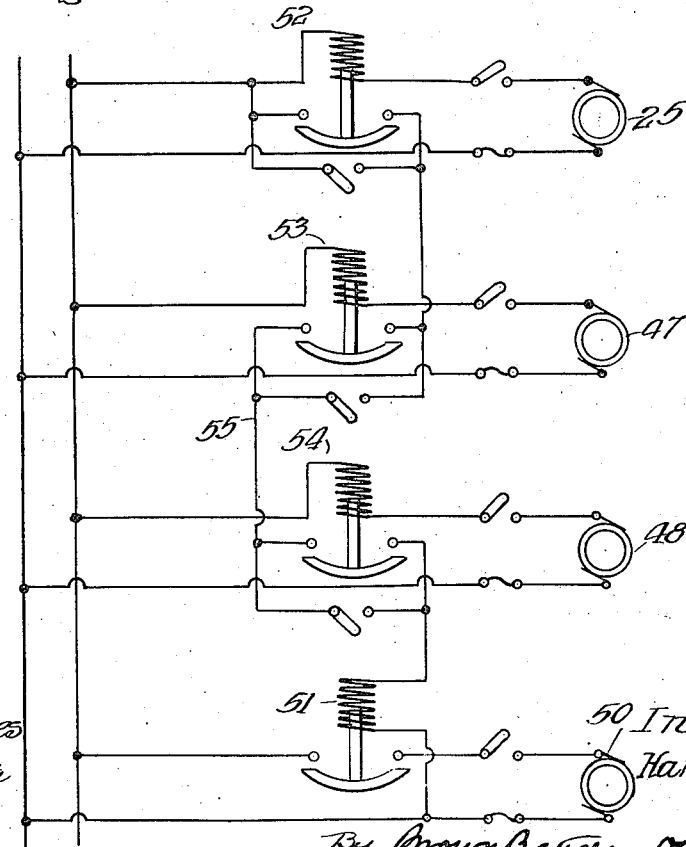

1,498,389

UNITED STATES PATENT OFFICE.

HARRY E. LA BOUR, OF CHICAGO, ILLINOIS, ASSIGNOR TO CHEMICAL EQUIPMENT COMPANY, OF CHICAGO, ILLINOIS, A CORPORATION OF ILLINOIS.

METHOD OF AND MEANS FOR TREATING LIQUIDS.

Application filed May 3, 1920. Serial No. 378,675.

*To all whom it may concern:*

Be it known that I, HARRY E. LA BOUR, a citizen of the United States, residing at Chicago, in the county of Cook and State of Illinois, have invented a certain new and useful Improvement in Methods of and Means for Treating Liquids, of which the following is a full, clear, concise, and exact description, reference being had to the accompanying drawings, forming a part of this specification.

My invention relates to a method of and means for treating liquids and more particularly, for deodorizing oils. This invention is particularly useful in treating edible oils, but is not to be limited to such use.

In the preparation of edible oils, such as corn oil, cotton seed oil, peanut oil, coconut oil and the like for human consumption, it is desirable to remove the characteristic odor or taste to make the oil more bland and palatable.

The suspended matter which may be contained in the crude oil can be removed by means of the filter press, but the characteristic odor or taste or rancidity is best removed, in so far as I am aware, by heating and scrubbing with steam. Such treatment has been possible heretofore only with the expenditure of a large amount of steam and in a batch treatment, by heating a large mass of the oil and blowing steam through it.

According to my invention, the edible oil is subjected to fine subdivision and while in that state, it is subjected to flash heating. While being thus subdivided and subjected to contact with a relatively large volume of steam which serves both as a washing medium and as a carrier for the volatile substance which it is desired to remove. It also insures the elimination of air from contact with the heated oil and thus protects the oil against oxidation or other injury.

In the treatment of edible oils in accordance with my invention, I conceive that other treating mediums may be employed and I do not intend to limit the invention to the use of steam only, but I find that in accordance with the present invention, the deodorizing of such oils as I have above indicated, can be successfully accomplished best by the use of heat and free steam in contact with the liquid oil in finely subdivided form. I find that the treatment of the oil or oils according to my invention improves the color and brilliance of the same. Treatment other than deodorization may also be carried on in apparatus of this general character, for example, the hydrogenation of oils.

More particularly, I provide a continuous method of treatment in which the oil is subdivided in a spray machine of the type disclosed in my prior patent and brought continuously at high velocity against a heated surface so that each particle of the oil is in contact with the heated surface for only a brief period of time. At the same time, a sufficiently large volume of steam is passed through the spray of oil in such a manner as to make intimate contact with the particles of oil. Thereby the deodorization is completed and the odoriferous material is completely carried away, and at the same time, the oil is protected against contamination or uncontrolled contact with air or other agents.

The hot oil which has been treated is then passed through a heat exchange apparatus operating on the counter-flow principle, so that the incoming oil is economically and continuously heated. The use of the heat exchange apparatus is of importance in that it effects a double saving of time and heat, first that which would be consumed in heating up the crude or raw oil and second that which would be consumed in cooling the refined or deodorized oil.

The hot refined oil is hereby cooled off at once and is not subject to oxidation or contamination or other injury.

An important feature of the process is that the oil is upon the flash surface for only a very brief period, and that period is definitely fixed in each machine or pass so that the process is always under proper control. Heretofore no control has been possible and variation of the product was invariably the result. This feature of rapid and continuous treatment of the oil is of the greatest importance in practice.

The deodorizing treatment with heat and steam or other reagents may be performed in one or more stages.

The apparatus which I provide is so interconnected that if any vital part or unit becomes disabled or fails to function, the entire system is shut down and the flow of oil is stopped until the trouble is remedied. The heat exchange apparatus is arranged to remain full of oil so that in case of interruption operation may at once be resumed. The pump motor is electrically interconnected with each of the motors driving the spray machines so that if any one of the spray machines is stopped, the pump motor is at once stopped and cannot be restarted until all the spray machines are in operation. In order to acquaint those skilled in the art with the manner of constructing and practising my invention, I shall not describe an embodiment of the same, which embodiment is illustrated in the accompanying drawings which form a part of the present specification.

Figure 1 which appears on two sheets gives a diagrammatic layout of a system embodying the invention which I have employed for the deodorizing of corn oil;

Figure 2 is a vertical section through one of the spray machines illustrating particularly the disposition of the heating coils within the same; and Figure 3 is a diagram of the motor connections.

The apparatus which I have employed in carrying out the process comprises one or more spray machines, such as illustrated at 1, 2 and 3 in the drawings, a counter-flow heat exchange apparatus as illustrated at 4, a feeding pump as illustrated at 5, a supply tank 6 for supplying the crude oil to be treated, and the receiving or storage tank 7 for receiving the refined oil. These parts are all interconnected as I shall describe more in detail. Legs 3' may be supplied to support the spray machines upon suitable flooring (not shown).

The spray machine which is of the general type shown in my prior Patent 1,318,774, Oct. 14, 1919, comprises the rotating throwing disk 10 upon which the oil to be treated is discharged by means of the pipe 11, the inclined wall 12 of the main casing, the fluid directing element or impeller 13, and the heating coil 14 disposed within the casing in such a manner as to be subject to the impingement of the particles thrown outwardly by the disk 10. A suitable casing 16 is provided at the lower end, this casing being formed to provide a steam chest or chamber 17 for containing the steam which is directed through the impeller 13 into contact with the subdivided oil as it is thrown from the disk 10 across the gap between the disk and the coil 14 and into contact with the coil 14. The steam chest 17 is provided with a pair of openings 18—19, the latter of which is closed by a suitable plate and has a discharge pipe 20 connecting through a check valve 21 to the oil outlet pipe 22 which leads the oil out of the bottom of the casing 16. The pipe 20 and check valve 21 are arranged to permit the discharge of any oil which might find its way into the steam chamber 17. The regular outlet for the oil is, of course, through the pipe 22. The opening 18 is employed for the admission of steam to the chest 17.

The driving shaft 23 of the rotatable element 13 extends downwardly through a suitable stuffing gland and is connected to the shaft of the driving motor 25. The heating coil 14 on the interior of the conical wall 12 is connected by a pipe 15 and valve 26 to a steam main 27 which supplies steam at a relatively high temperature and preferably superheated. The lower end of the coil 14 is connected by way of a pipe 28 either with the steam bleeder line 29 through the valve 30, or with the interior of the steam chest 17 through the valve 31. Each of the spray machines have a vent at its upper end to permit of the escape of free steam and gas bearing the constituents or substances which it is desired to remove.

The three spray machines are arranged at different levels so that the oil may be fed through them by gravity for successive or stage treatment. Thus the pipe 22 which is the discharge pipe, of machine 1 becomes the inlet pipe of machine 2 the discharge pipe 33 of the second machine 2 becomes the inlet pipe for the third machine 3. I have provided sampling outlets 34 one at the discharge pipe of each machine.

The discharge pipe 35 of the third machine leads to the lower end of the heat exchange apparatus 4, the hot oil being led by this pipe and through the pipes of the heat exchange apparatus upwardly until the outlet pipe 36 is reached. This outlet pipe 36 of the heat exchange apparatus during normal operations communicates by way of the three-way valve 37 with the discharge pipe 38 which latter pipe delivers the refined oil into the receiving tank 7. The pump 5 is connected by its inlet pipe 40 with the supply tank 6 through the valve 41 and with the by-pass 42 to the discharge pipe of the heat exchange apparatus through the three-way valve 37. The discharge pipe 43 of the pump 5 communicates with the return pass of the heat exchange device 4 through the valve 44 and flow meter 45. The raw oil which is thus discharged into the return pass of the heat exchange apparatus 4 flows counter to the direction of flow of the refined oil, the opposite end of this pass being connected to the pipe 11 which pipe delivers the heated oil upon the first spray disk.

The temperature of the hot refined oil may be observed upon the thermometer 46 which is introduced into the discharge line 35.

As indicated diagrammatically in Figure 3, the motors for driving the spray machines 1, 2 and 3 are so interconnected with the motor 50 for driving the centrifugal pump 5 that if any one of the spray machine motors goes out of commission, the pump 5 will be stopped. In the present instance, I accomplished this by means of a relay 51 the contacts of which are connected in series with the circuit of the motor 50 and the control circuit of which relay is cut through the contacts of series relays 52, 53, and 54 of the motors 25, 47 and 48 respectively. These control relays 52, 53, and 54 are in series relation with the motors 25, 47 and 48 respectively so that so long as a normal flow of current to each motor occurs, the control circuit 55 will be closed through the winding of the relay 51 holding the circuit of the motor 50 closed, but as soon as the circuit of any one of the above motors is interrupted, the feeding pump 5 is immediately stopped. The feeding pump 5 cannot again be started until the motors 25, 47 and 48 are all in operation.

In order to treat the different oils, it is necessary to observe different temperature conditions, but the same general treatment and method of operation is employed for the various oils which are to be treated.

To start the system in operation, the valves 26, which are all connected to the high temperature steam main 27, are opened to bring the heating coils 14 to the proper temperature for operation. The valves 31 are closed at this time and the valves 30 are opened so that the live steam blows through the heating coils 14 to the steam bleeding line 29 to heat up the spray machines, and to remove all condensation from the line. Thereafter, the spray machine motors are started into operation to turn the rotatable elements within these machines at the proper speeds ready for operation. The valve 37 which is a three-way cock is thrown to open the by-pass 42 and close the discharge pipe 38 which leads to the oil storage tank 7. The valve 41 is then opened to admit raw oil to the pump and the pump motor 50 is then started and thereafter the valve 44 is opened until the proper flow is registered on the flow meter 45. Then as soon as the oil begins to be discharged into the pipe 11 the drain valves 30 are closed and the valves 31 are opened to permit the live steam which has passed through the heating coil 14 to pass into the steam chest 17 of each spray machine and there be directed by the rotating impeller 13 into contact with the spray of fine particles of oil which are thrown outward radially in a sheet or curtain from the disk 10 against the heating coil 14. The drops of oil have a rotary motion on their own axes, as well as a radial and circular motion with respect to the disk. The oil which is thus discharged against the heating coil 14 in the first machine drops down into the lower part of the chamber 16, which forms a dead space or pocket, and is discharged by way of the connection 22 to the spraying disk of the next machine 2, where it is again treated and then discharged to the third machine. So far the operation is directed only to bringing a body of oil to the deodorizing temperature, the steam in contact with the oil serving primarily to protect the oil against injury. When the oil which has passed through the spray machines and heat exchange apparatus reaches the threeway cock 37 it returns to the pump suction and is recirculated through the system until the deodorizing temperature is attained. When this occurs, deodorizing of this particular volume of oil is complete. The threeway cock 37 may now be thrown so as to permit the finished oil to be discharged to the receiving tank 6. The operation from this stage on is continuous, the heated oil being discharged back through the pipe 35 to the bottom of the heat exchange apparatus and imparting its heat to the incoming raw or crude oil. The finished cold oil is discharged from the top of the heat exchange apparatus and is put into the storage tank 7.

In the treatment of corn oil I have found that complete deodorization occurs in two passes of the oil through the spray machine, that is to say, machine No. 3 was unnecessary at the rate of 7 gallons per minute and the oil could be passed directly from the discharge of machine No. 2 to the heat exchange apparatus 4 by means of the pipe 35 through a suitable shunt connection (not shown). In the runs which I have conducted, I have employed a spray machine, 43" in diameter, having a 12" disk rotating at full motor speed—that is approximately 1800 R. P. M.—the oil being fed into the machine at a temperature of approximately 280 degrees F. at the rate of 7 gallons of oil per minute leaving the spray machines at a temperature of from 300 to 340 degrees F., and steam at a temperature of from 400 to 500 deg. F., was supplied to the coils 14 and discharged into the steam chest within the spray machine. The coils are really hotter than the oil could endure if subjected to the temperature continuously, but the time of contact of the particles of oil with the flash surface is so brief, and the mixture with free steam is so intimate that deodorization can be completed without injury to the oil. I have found that cotton seed oil fed at the rate of approximately 7 gallons per minute requires three passes for complete deodorization.

In the operation of the machine it will be understood that an intimate mixture of oil and steam is projected out both radially and tangentially due to the mode of generating the motion of the particles. The coils 14 are arranged within the sloping wall and the bottom of the casing and the coils are arranged with respect to the direction of rotation so that the tangential movement of the fluids tends to drive the oil down along the steam pipes. In other words the coils of the steam pipe lead downward with the direction of rotation of the disk. Another important feature is the fact that the whirling motion which is given to both the oil particles and the steam produces a centrifugal effect which precipitates or throws down the oil particles with great thoroughness.

I am unable to explain just what the inherent action is that occurs in securing the action of deodorization, but I shall explain as well as I am able to form an opinion, the theory which appears to me best to fit the facts which I have observed. I believe that the heating of the raw oil increases the partial vapor pressure of the constituents which are to be removed and that the mere separate heating of the oil and subsequent passing of live steam therethrough will remove considerable of the constituent which causes the objectionable odor. However, to complete the deodorization this action alone is not satisfactory and is, in fact, unsuccessful.

According to my opinion, it is necessary to bring the oil to a higher temperature than it would be able to stand if heated alone in order to further increase the partial vapor presence of the undesirable constituents. Without the pressure of steam or moisture, the oil will not stand for heating beyond this temperature, and if it were attempted to heat it up to the point necessary to drive off the odoriferous constituents, some part would become heated beyond this critical point and would be burned or otherwise damaged.

According to my theory of operation the best practice is to treat only a relatively small quantity at a given instant so that no individual particle will be overheated and simultaneously to thoroughly mix free steam with the oil particles so that the mixture is projected against the heating surface, the steam serving as a protection thermally and at the same time performing the laundering effect which is desired to scrub out and carry away the odoriferous constituent.

During the brief period that any given particle of the oil is in contact with the flash surface the partial vapor pressure of the odoriferous constituent is sufficiently increased to permit it to pass off into the adjacent atmosphere of steam which removes it.

In carrying out the process I have found it advisable to control the rate at which the oil is treated to about seven to ten gallons per minute for this particular size apparatus and if this rate is much exceeded, the free carrying on of the process is interfered with by the excess of oil and the results are not satisfactory. I do not mean by this to limit the rate at which the oil may be treated; I am merely indicating to those skilled in the art the caution to be observed with regard to the relative proportions between the steam and oil.

The steam which, as I have indicated, is introduced at about 100 lbs. pressure, heats the coils to between 400 and 500 deg. F. and is then permitted to enter the steam chest of the spray machine having lost by that time substantially all of its superheat so that it enters the spray substanially as saturated steam.

As I have previously indicated, in carrying out the process, particularly with respect to different oils, variations are advisable and I do not intend to limit the invention to any iron clad rule of procedure; for instance, all or part of the steam from the coils 14 may be discharged into the spray machine, or steam from another source may be discharged into the steam chest 17 of the spray machine. Also if it is found that one or two passes are sufficient instead of more, the spray machines which are not used may be by-passed, or they may be employed merely for drying purposes. Where it is desired to dispense with one of the spray machines, the electrical relay corresponding to that particular machine may be short circuited by a suitable switch as indicated on Figure 3. Instead of employing a single phase electrical power line as I have indicated in Figure 3, a three-phase line may be employed and in that case the controlling relay of each circuit is subject to two phases instead of a single phase, as is well understood by those skilled in the art of electrical controlling devices.

I claim:

1. The method of deodorizing liquids, which comprises heating the liquid, subdividing the liquid into finely comminuted form, projecting the liquid in finely divided form at high velocity into contact with a flash heating surface and simultaneously passing a mass of steam through the comminuted liquid.

2. The method of deodorizing corn oil, which comprises heating the oil to substantially 300–340 degrees F., projecting the oil in finely subdivided or comminuted form against a flash surface heated to substantially 400–500 degrees F., and simultaneously projecting a stream of steam through the spray of oil at substantially the point where it encounters the flash surface, the steam being of substantially saturated quality and substantially at or above the temperature of the oil.

3. The method of deodorizing a liquid which comprises, heating the liquid, spraying the same from a whirling disk against a flash heating surface in an atmosphere of steam and collecting the liquid downwardly and passing the steam away upwardly.

4. In combination, a supply tank, a heat exchange device, a pump for moving liquid from the supply tank downwardly through the heat exchange device and driving the same upwardly to a spray device, a spray device comprising means for bringing the liquid in finely subdivided form into contact with a flash surface, means for projecting the liquid from the spray device upwardly through the heat exchange device, a discharge connection from the upper end of the heat exchange device, and a by-pass connection between the discharge pipe last mentioned and the intake of said pump.

5. The method of treating edible oil which comprises projecting the oil in a thin curtain, simultaneously discharging a blast of steam in the same general direction into contact with the curtain of oil and causing said oil and steam to strike momentarily a heated surface.

6. The method of deodorizing a liquid for food purposes which comprises projecting the liquid in a thin stream or curtain, simultaneously discharging a blast of gas in the same general direction in contact with the liquid, causing the liquid to strike momentarily a heated flash surface and be deflected into a relatively quiescent zone.

7. The method of treating liquids which comprises heating the liquid, projecting a curtain of drops of the liquid and projecting a sheet of steam in substantially the same direction, passing the steam through the curtain of liquid, causing the drops of liquid to strike a heated surface, and whirling the mass of steam and liquid to free the steam of the entrained liquid by centrifugal action.

8. The method of treating liquids which comprises heating the liquid, projecting the same in finely subdivided form, simultaneously projecting a blast of steam into contact with the liquid and causing the steam and subdivided liquid to strike momentarily a heated flash surface, then collecting the liquid and passing the heated liquid in counter flow in thermal contact with the incoming raw liquid.

9. In combination, a casing having an outlet in its upper end for gases or vapors and an outlet in its lower end for liquid, means concentric with said casing for throwing a spray of liquid outward radially into contact with the casing, means below the spray of liquid for creating a blast of gas which is brought into contact with the spray of liquid, and means for heating the liquid after it has been brought into contact with the blast of gas, said latter means comprising a coil disposed within the casing.

10. In combination, a rotating disk for spreading a liquid by centrifugal action, an impeller for lighter fluids immediately below said spreading disk, means for driving said disk and said impeller, and a heated wall surrounding said disk and impeller.

11. In combination, a casing having an outlet in its upper end for gases and an outlet in its lower end for liquids, a heating coil for heating the wall of the casing, means for throwing radially a sheet of liquid against said wall, and means for discharging a heating medium from said heating coil into the lower portion of said casing below the sheet of liquid.

12. In combination, a rotating disk for spreading a liquid by centrifugal action, an impeller for lighter fluids immediately below said spreading disk, a heating coil surrounding said disk and impeller and a connection for discharging a heating medium from said coil below the rotating disk to be directed by said impeller.

13. In combination, a rotating disk for spreading a liquid by centrifugal action, a heating coil surrounding said disk, and a connection for discharging heating mediums from said coil below said disk.

14. In combination, a supply tank, a storage or receiving tank, a heat interchange apparatus, means for passing the liquid from the supply tank downwardly through one pass of the heat exchange apparatus, means for spraying the liquid in contact with steam against a heated surface, means for passing the liquid upwardly through the heat exchange apparatus, and discharging the liquid from the upper end of the heat exchange apparatus into the storage tank.

15. In combination, a supply tank, a heat exchange device, a spray machine comprising means for spraying the liquid in contact with a flash surface, and a storage tank and a pump for moving the liquid from the supply tank downwardly through the heat exchange apparatus to the spray machine and permitting the liquid by gravity to flow from the spray machine upwardly through the heat exchange apparatus to the storage tank.

16. In combination, a supply tank, a heat exchange device, a plurality of spray machines connected in series, each spray machine comprising liquid spraying means for discharging a fine spray of liquid in contact with an atmosphere of steam against a heated flash surface, and a discharge connection or storage tank, a pump for moving the liquid from the supply tank downwardly through the heat exchange device and upwardly to the spray machine, and means for conducting the liquid from the spray machines by gravity to the lower portion of the heat exchange device, and a connection from the upper end of the heat exchange device for discharging the liquid in the cold stage into the storage tank.

17. In combination, a supply tank, a heat exchange device, a pump between the supply tank and the heat exchange device, a spray machine comprising means for projecting a stream of finely subdivided liquid into contact with the heated flash surface, and a discharge connection from the upper end of the heat exchange apparatus, said pump being adapted to drive the liquid from the supply tank downwardly through the heat exchange apparatus and from the lower end of the heat exchange apparatus to deliver the same to the spray machine, the liquid being moved upwardly through the heat exchange apparatus in counter-flow to the incoming liquid, and a by-pass between the outlet connection of the heat exchange apparatus and the suction pipe of the pump.

18. In combination, a supply tank, a heat exchange device, a pump for moving liquid from the supply tank downwardly through the heat exchange device, and driving the same upwardly to a spray device, a flash surface, a spray device comprising means for bringing liquid in finely subdivided form into contact with the flash surface, means for projecting the liquid from the spray device upwardly through the heat exchange device, and a discharge connection from the upper end of the heat exchange device.

In witness whereof, I hereunto subscribe my name this 1st day of May, A. D. 1920.

HARRY E. LA BOUR.